United States Patent [19]

Nakamura

[11] 4,246,246
[45] Jan. 20, 1981

[54] METHOD FOR MANUFACTURE OF HYDRATED BORATES

[75] Inventor: Sen-ichi Nakamura, Nagoya, Japan

[73] Assignee: Agency of Industrial Science & Technology, Ministry of International Trade & Industry, Tokyo, Japan

[21] Appl. No.: 45,865

[22] Filed: Jun. 6, 1979

Related U.S. Application Data

[63] Continuation-in-part of Ser. No. 967,360, Dec. 7, 1978, abandoned.

[30] Foreign Application Priority Data

Dec. 10, 1977 [JP] Japan ................................. 52/148399
Dec. 10, 1977 [JP] Japan ................................. 52/148400
Jan. 23, 1978 [JP] Japan ..................................... 53/6604

[51] Int. Cl.$^3$ ....................... C01B 35/10; C01F 17/00
[52] U.S. Cl. ..................................... 423/263; 423/279
[58] Field of Search ........................ 423/21, 263, 279

[56] References Cited

FOREIGN PATENT DOCUMENTS 2630914 10/1977 Fed. Rep. of Germany ........... 423/263

OTHER PUBLICATIONS

Mellor; *A Comp. Treatise on Inorg. & Theor. Chem.*; vol. 5, Longmans, Green & Co., N. Y. 1924; pp. 102–104.

*Primary Examiner*—G. O. Peters
*Attorney, Agent, or Firm*—Oblon, Fisher, Spivak, McClelland & Maier

[57] ABSTRACT

The class of compounds represented by the generic formula, $Ln_2(BO_2)_2(CO_3)_2 \cdot 5H_2O$ wherein Ln stands for a rare-earth element, have never been known to the art. These novel compounds are produced by allowing $Ln_2(CO_3)_3 \cdot mH_2O$ (wherein, m is a number not greater than 15) and boric acid, $H_3BO_3$, to react with each other at a molar ratio of 1:2 under a practically air-tight condition in a container, with the $CO_2$ gas removed continuously as it is formed in the course of the reaction.

1 Claim, 2 Drawing Figures

METHOD FOR MANUFACTURE OF HYDRATED BORATES

REFERENCE TO COPENDING APPLICATION

This is a continuation-in-part of my copending application Ser. No. 967,360 filed Dec. 7, 1978 now abandoned.

BACKGROUND OF THE INVENTION

This invention relates to hydrated carbonate-borates of rare-earth elements which are novel compounds and to a method for the manufacture of these borates.

Many carbonates and anhydrous borates of rare-earth elements are already known in the art. Nothing, however, is known in the art about hydrated carbonate-borates of rare-earth elements. The present invention has originated in a discovery made by the inventor while he was continuing a study on the synthesis of various hydrated borates.

Heretofore, hydrated borates have been manufactured by a general procedure comprising the steps of mixing an aqueous solution of borax, boric acid or a mixture thereof with an aqueous solution of a compound which is capable of readily dissolving the component elements making up the borate under preparation, consequently causing eduction of the hydrated borate in the reaction system, subjecting the resultant reaction mixture to filtration and subsequently washing the separated hydrated borate with water or methanol.

Where a hydrated borate is manufactured by this aqueous-solution reaction, however, it is difficult to have substantially all the boron component present in the solution educed in the form of a borate. Generally, the eduction of a borate from its aqueous solution more often than not takes place at a slow rate.

Further, the steps of filtration and washing bring about the possibility of lowering the yield of the hydrated borate because of the ready dissolution of the compound in the course of washing and the possibility of degrading the purity of the produced hydrated borate because of the occasional if not inevitable hydrolysis of the compound under certain conditions.

An object of the present invention is to provide hydrated carbonate-borates of rare-earth elements particularly in the form of pentahydrates, which have never been known in the art.

Another object of the present invention is to provide a method for manufacturing hydrated carbonate-borates of rare-earth elements particularly in the form of pentahydrates, which have never been known in the art, in high yields without inclusion of any residual secondary product by a simple procedure productive of no industrial waste.

SUMMARY OF THE INVENTION

With a view to accomplishing the objects described above, the inventor continued a study in search of a method capable of allowing hydrated carbonates of rare-earth elements and boric acid to react with each other in a state very close to a solid phase. He has consequently ascertained that the hydrated carbonate-borate is produced by causing the reaction to proceed in a state very close to a solid phase within a container of perfect or nearly perfect air-tight construction such as to obstruct escape, during the reaction, of the water of crystallization present inherently in the reactants or the small amount of water added for the sake of the reaction. The present invention has issued from this discovery.

To be specific, the novel hydrated carbonate-borate of the generic formula:

$$Ln_2(BO_2)_2(CO_3)_2.5H_2O \tag{1}$$

(wherein, Ln denotes at least one member selected from the group consisting of the rare-earth elements) is obtained by mixing a compound of the generic formula:

$$Ln_2(CO_3)_3.mH_2O \tag{2}$$

(wherein, m is a number not greater than 15) with boric acid, $H_3BO_3$, in a molar ratio of 1:2 and subjecting the resultant mixture, either in its unaltered form or in the presence of water added thereto, to a reaction.

Although the compounds of the generic formula (2) are not very rigidly limited with respect to the coefficient "m", the upper limit of m < 15 has been fixed simply in view of the fact that none of the existing compounds of the formula have more than 15 hydrates in their molecules.

When the novel hydrated carbonate-borates of the generic formula (1) are dehydrated such as by heating, there are obtained low-hydrate or non-hydrate salts of the generic formula:

$$Ln_2(BO_2)_2(CO_3)_2.nH_2O \tag{3}$$

(wherein n denotes a number between 0 to 4).

DETAILED DESCRIPTION OF THE INVENTION

Figure 1:
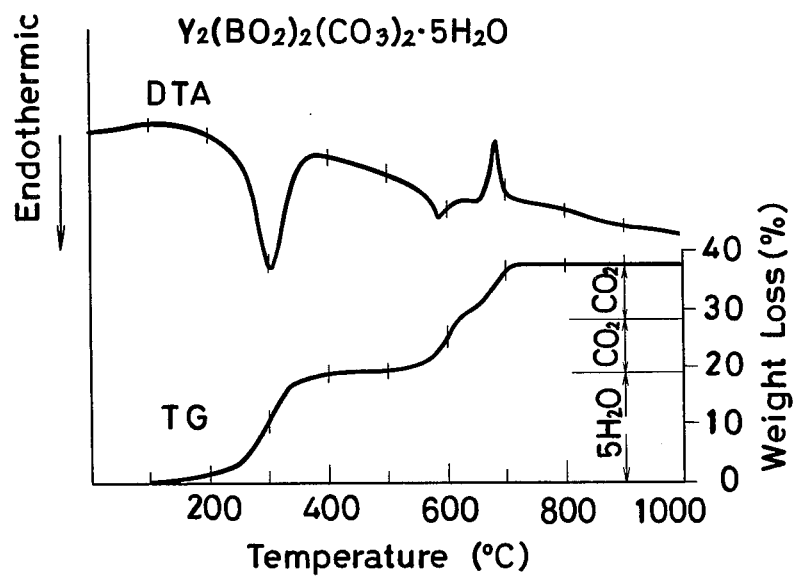
FIG. 1 is a diagram showing the results of a test performed on the novel substance of the present invention obtained as described in Example 1, by means of a differential thermal analyzer and a thermobalance.

There exist a total of 17 rare-earth elements: scandium, yttrium, lanthanum, cerium, praseodymium, neodynium, promethium, samarium, europium, gadolinium, terbium, dysprosium, holmium, erbium, thulium, ytterbium and lutetium. The present invention is effectively applicable invariably to all these rare-earth elements.

The raw material for the manufacture of the novel compound of the present invention is obtained by mixing the hydrated carbonate of a rare-earth element with boric acid, $H_3BO_3$, at a molar ratio of 1:2. The resultant mixture is subjected to a reaction either in its unaltered form or in the presence of water added thereto in an amount of up to 150% by weight based on the total amount of the mixture.

Since carbon dioxide does no harm at all to the reaction involved herein, it may be present in the raw material and in the water to be added thereto for the convenience of the reaction. Although the moiety Ln of the generic formula generally consists of just one rare-earth element, it may consist of two or more rare-earth elements. Insofar as the reactant compounds are mixed at the aforementioned molar ratio to form the starting material and the resultant mixture is subjected to the reaction, the reaction has no possibility of giving rise to a mixture of two hydrated borates containing boric oxide in different molar ratios or of a part of the starting material remaining unaltered in the resultant reaction product. As a result, the reaction product requires neither filtration nor washing.

The molecular formula $H_3BO_3$ of the boric acid as the raw material can also be represented as $\frac{1}{2}(B_2O_3.3H_2O)$, which signifies that this compound possesses water in its molecular unit. The reaction occurs on the reactants in the presence or absence of water added to the starting material. In terms of mass balance, the portions of water inherently present in the boric acid, $H_3BO_3$, and the hydrated carbonate of a rare-earth element will suffice for supply of water for the hydrated carbonate-borate to be produced in consequence of the reaction. In actuality, when the starting material contains an element of the cerium family ($^{57}La$ to $^{62}Sm$), for example, the reaction requires no addition of water. When the starting material happens to contain an element of the yttrium family ($^{21}Sc$, $^{39}Y$, $^{63}Em$ to $^{71}Lm$), for example, addition of water proves to be advantageous for the reaction.

When water is added to the starting material, it is desirable to control the amount of added water so that the added water will convert the starting material into a sludge dense yet fluid enough to ensure thorough homogenation of the mixture. Specifically, the maximum amount of water thus added to the reaction system is 150% by weight on the basis of the total weight of the starting material used in the reaction. If the amount of added water exceeds the above-mentioned maximum, the reaction system becomes an aqueous solution. For the reaction to proceed in a perfectly or practically solid phase, therefore, the amount of water to be added to the reaction system must be controlled as defined above.

As the reaction proceeds, the water of crystallization contained in the raw materials is gradually liberated. The water thus liberated as well as the water added to the reaction system participates in the reaction either in the direction of accelerating the reaction through encouraged diffusion of the reactants in the reaction system or in the direction of partially dissolving the reactants, aiding in their mutual reaction and facilitating the eduction of the reaction product in a cyclic manner. If the hydrated borate under preparation can rely for supply of its own water of crystallization solely upon the water of crystallization contained in the raw materials or the water contained in the boric acid, therefore, the small amount of water externally added to the mixture of raw materials may well be regarded as fulfilling a catalytic function in the reaction. If, on the other hand, the amount of water to be added to the mixture is more than is needed, then the excess water will have a disadvantageous effect of separating the reaction system into a liquid phase and a solid phase, with the molar ratio of the two components varied between the two separated phases owing to the different degrees of solubility exhibited by the two reactants, lowering the yield of the product aimed at because of undesirable solubility, and increasing the number of steps involved in the entire process of manufacture by inevitable addition of extra steps such as for recovery of the dissolved reaction product from the aqueous solution.

Besides the addition of the small specified amount of water touched upon above, the method of the present invention may cause the initiation of the reaction between the reactants to be expedited by suitably resorting to various means such as, for example, application of heat to the reaction system, size reduction of the raw materials as by attrition, exposure of the mixture of reactants to ultrasonic waves or addition of a minute amount of an organic acid such as acetic acid. When the addition of the organic acid is resorted to for the purpose mentioned above, the amount of the organic acid to be added should be so small that the resultant reaction mixture, upon powder X-ray diffraction, will not be found to contain any detectable amount of the corresponding salt of the organic acid.

One important requirement for the method of the present invention is that the reaction should proceed in a perfectly closed or nearly perfectly closed system so that the water of crystallization and other water contained originally in the raw materials and liberated in the course of the reaction as well as the small amount of externally added water is prevented from escape out of the system as much as possible and may be utilized to advantage for the reaction until completion of the reaction.

When the starting material placed in the container begins to undergo the reaction, it is desirable to have the container shaken or vibrated occasionally so as to give effective agitation to the reactant mixture held inside the container, facilitate the liberation of the formed carbon dioxide from the reactant mixture and, consequently, keep the interior pressure of the container constantly about one atmosphere. Insofar as the reaction is carried out in this manner, little water is suffered to escape from the reaction system.

The method of this invention is not specifically limited with respect to the reaction temperature and reaction time. Generally, the reaction is advantageously carried out at temperatures exceeding normal room temperature of 30° C., for example, preferably in the range of from 50° to 100° C., for several hours to some tens of hours. The reaction proceeds with generation of carbon dioxide. In the absence of added water, the reaction system retains its powdery state throughout the entire reaction. In the presence of added water, however, the reaction system which is initially in the form of sludge gradually gains in viscosity and transforms transiently to a doughy state and eventually to a solid state.

The decrease of weight of the reaction system due to the escape of the generated carbon dioxide or the termination of the generation of carbon dioxide is a clear sign that the reaction has reached its end point.

In the manner described above, the hydrated carbonateborate represented by the generic formula (1) is produced with under conditions which prevent the product from containing any impurities therein.

The present invention will later be more specifically described with reference to working examples, in which the novel compounds of the present invention were identified as described below.

The reaction performed by the method of this invention proceeds as expressed by the following reaction formula.

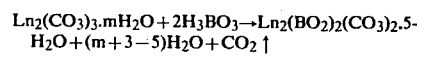

The various analyses and determination involved in the working examples of this invention were as enumerated below:

(a) The starting material is weighed before the reaction and the reaction product weighed after the reaction. The difference between the two weights (decrease of weight) represents the amount of carbon dioxide released from the reaction container during the reaction.

(b) The reaction product is weighed before and after desiccation. The difference between the two weights represents the approximate amount of the water of crystallization lost from the main product during the desiccation.

(c) The main product of the reaction is weighed to determine the yield of the product based on the weight of the starting material. If the reaction has been thorough, the yield permits rough estimation of the molecular weight of the product.

(d) The termination of the reaction and the identification of the reaction product are accomplished by sampling the reaction system at intervals and assaying the samples by the powder X-ray diffraction technique.

(e) The contents of the water of crystallization and carbon dioxide are determined by subjecting the samples of simultaneous assay by the DTA (differential thermal analysis) and TG (thermobalance) techniques.

(f) The $CO_2$ content is determined by gas chromatography.

(g) The $Ln_2O_3$ and $B_2O_3$ contents of the product are determined by chemical analysis (using the chelate titration and atomic absorption techniques).

Now, the method by which the low-hydrated or non-hydrated salt, $Ln_2(BO_2)_2(CO_3)_2 \cdot nH_2O$ (wherein, n=0 to 4), which is also a novel substance, is produced from the pentahydrate of the generic formula (1) will be described. This method simply consists of heating the compound, $Ln_2(BO_2)_2(CO_3)_2 \cdot 5H_2O$, at temperatures in the range of from 50° to 800° C., so that it will be quite readily dehydrated and decarbonated into the aforementioned low-hydrated carbonate borate, non-hydrated carbonate borate or non-hydrated borate.

The low-hydrated or non-hydrated salt produced from the pentahydrate as described above is generally a loosely bound mass of fine particles. It can be easily disintegrated into finely divided particles by application of slight pressure. Since the finely divided salt is obtained without any step of pulverization, the production of the powdered salt has no possibility of entailing contamination. The product in its unrefined state has a high purity of 98%.

The novel compounds obtained by the method of this invention are useful as raw materials for $LnAl_3(BO_3)_4$ and $LnCr_3(BO_3)_4$ employed in the production of piezzoelectric articles and fluorescent articles and as raw materials for glazes applicable to ceramics and enamels.

Now, the present invention will be described more specifically with reference to working examples.

EXAMPLE

A varying combination of raw materials indicated below was placed in an air-tightly sealable container having an inner volume of 100 ml and, with the container sealed tightly, subjected to a reaction. After completion of the reaction, the reaction product in the container was air-dried until its weight fell to a constant level. The air-dried reaction product was weighed, with the apparent yield calculated on the basis of the reaction formula. During the reaction, the interior pressure of the container was kept about one atmosphere and the carbon dioxide gas formed by the reaction was released occasionally from the container by slightly opening the lid. Consequently, the amount of water which escaped from the container was negligibly small. The product was identified by means of X-ray diffraction, chemical analysis, thermal analysis and calculation of yield as described in detail previously. The various combinations of raw materials, reaction conditions and results used in the test runs are shown below.

| Starting material | Reaction conditions | Amount of product obtained and apparent yield after air-drying | Identification |
| --- | --- | --- | --- |
| 9.187 g (1/50 mol of $Y_2(CO_3)_3 \cdot 5.65H_2O$, 2.473 g (2/50 mol) of $H_3BO_3$ and 11.9 g (33/50 mol) of $H_2O$ | Kept at 90° C. for 21 hours. | 9.48 100.1% | Results of X-ray diffraction analysis shown in Table 1. Heat loss by differential thermal analysis and thermobalance shown in FIG. 1. The product was identified to be $Y_2(BO_2)_2(CO_3)_2 \cdot 5H_2O$. |
| 11.053 g (1/50 mol) of $La_2(CO_3)_3 \cdot 6.3H_2O$ and 2.473 g (2/50 mol) of $H_3BO_3$ | Kept at 70° C. for 21 hours. Loss of weight 1.103 g due to dehydration (equivalent to 1.25/50 mol of $CO_2$). | 11.48 100.1% | Results of X-ray diffraction analysis shown in Table 2. Heat loss by differential thermal analysis and thermobalance shown in FIG. 2. The product was identified to be $La_2(BO_2)_2(CO_3)_2 \cdot 5H_2O$. |
| 7.964 g (1/70 mol) of $Ce_2(CO_3)_3 \cdot 5.4H_2O$, 1.767 g (2/70 mol) of | Same as in Run 1. | 8.09 g 98.3% | Results of X-ray diffraction analysis shown in Table 3. |

-continued

| Starting material | Reaction conditions | Amount of product obtained and apparent yield after air-drying | Identification |
|---|---|---|---|
| $H_3BO_3$ and 5.14 g (20/70 mol) of $H_2O$ | | | The product was identified to be $Ce_2(BO_2)_2(CO_3)_2 \cdot 5H_2O$. Results of X-ray diffraction analysis shown in Table 4. |
| 8.483 g (1/70 mol) of $Pr_2(CO_3)_3 \cdot 7.33H_2O$, 1.766 g (2/70 mol) of $H_3BO_3$ and 6.43 g 25/70 mol) of $H_2O$ | Same as in Run 1. | 8.29 g 100.4% | The product was identified to be $Pr_2(BO_2)_2(CO_3)_2 \cdot 5H_2O$. Results of X-ray diffraction analysis shown in Table 5. |
| 7.572 g (1/70 mol) of $Sm_2(CO_3)_3 \cdot 2.74H_2O$, 1.766 g (2/70 mol) of $h_3BO_2$ and 9.00 g (35/70 mol) of $H_2O$ | Same as in Run 1. | 8.36 g 99.9% | The product was identified to be $Sm_2(BO_2)_2(CO_3)_2 \cdot 5H_2O$. |

TABLE 1

Results of X-ray diffraction analysis of $Y_2(BO_2)_2(CO_3)_2 \cdot 5H_2O$ Rhombic system: $a_0$: 8.918, $b_0$: 9.078, $c_0$: 6.106

| d | $I/I_1$ | hkl | d | $I/I_1$ | hkl |
|---|---|---|---|---|---|
| 6.10 | 100 | 001 | 2.127 | 14 | 041 |
| 4.53 | 71 | 020 | 2.092 | 20 | 401 |
| 4.45 | 65 | 200 | 2.037 | 13 | 003 |
| 3.641 | 10 | 021 | 2.022 | 13 | 240 |
| 3.600 | 10 | 201 | 2.002 | 13 | 420 |
| 3.177 | 72 | 220 | 1.920 | 21 | 241 |
| 3.051 | 28 | 002 | 1.902 | 10 | 421 |
| 2.819 | 40 | 221 | 1.854 | 13 | 023 |
| 2.753 | 28 | 112 | 1.822 | 7 | 042 |
| 2.591 | 4 | 131 | 1.801 | 7 | 402 |
| 2.562 | 9 | 311 | 1.716 | 7 | 223 |
| 2.531 | 17 | 022 | 1.686 | 9 | 242 |
| 2.520 | 19 | 202 | 1.674 | 7 | 422 |
| 2.203 | 22 | 222 | 1.591 | 4 | 440 |

TABLE 2

Results of X-ray diffraction analysis of $La_2(BO_2)_2(CO_3)_2 \cdot 5H_2O$ Rhombic system: $a_0$: 8.884, $b_0$: 9.636, $c_0$: 6.433

| d | $I/I_1$ | hkl | d | $I/I_1$ | hkl |
|---|---|---|---|---|---|
| 6.42 | 100 | 001 | 2.146 | 10 | 003 |
| 4.81 | 53 | 020 | 2.117 | 10 | 240 |
| 4.431 | 41 | 200 | 2.098 | 13 | 401 |
| 3.857 | 14 | 021 | 2.061 | 1 | 331 |
| 3.651 | 15 | 201 | 2.011 | 20 | 240 |
| 3.260 | 39 | 220 | 1.960 | 6 | 023 |
| 3.216 | 30 | 002 | 1.927 | 17 | 042 |
| 2.908 | 34 | 221 | 1.828 | 5 | 402 |
| 2.887 | 2 | 112 | 1.793 | 7 | 223 |
| 2.677 | 12 | 022 | 1.769 | 8 | 242 |
| 2.604 | 13 | 202 | 1.709 | 6 | 422 |
| 2.409 | 4 | 040 | 1.635 | 3 | 440 |
| 2.291 | 18 | 222 | 1.605 | 1 | 060 |
| 2.256 | 11 | 041 | 1.583 | 1 | 441 |
| 2.218 | 4 | 400 | 1.560 | 3 | 114 |

TABLE 3

Results of X-ray diffraction analysis of $Ce_2(BO_2)_2(CO_3)_2 \cdot 5H_2O$ Rhombic system: $a_0$: 8.846, $b_0$: 9.578, $c_0$: 6.395

| d | $I/I_1$ | hkl | d | $I/I_1$ | hkl |
|---|---|---|---|---|---|
| 6.38 | 100 | 001 | 2.211 | 3 | 400 |
| 4.78 | 41 | 020 | 2.190 | 2 | 132 |
| 4.418 | 32 | 200 | 2.132 | 11 | 003 |
| 3.831 | 13 | 021 | 2.104 | 9 | 240 |
| 3.635 | 14 | 201 | 2.090 | 12 | 401 |
| 3.247 | 32 | 220 | 2.001 | 13 | 241 |
| 3.197 | 33 | 002 | 1.948 | 7 | 023 |
| 2.896 | 26 | 221 | 1.916 | 17 | 042 |
| 2.869 | 10 | 112 | 1.819 | 5 | 402 |
| 2.661 | 15 | 022 | 1.783 | 5 | 223 |
| 2.591 | 13 | 202 | 1.759 | 7 | 242 |
| 2.395 | 3 | 040 | 1.700 | 5 | 313 |
| 2.280 | 16 | 222 | 1.626 | 2 | 440 |
| 2.241 | 10 | 041 | | | |

TABLE 4

Results of X-ray diffraction analysis of $Pr_2(BO_2)_2(CO_3)_2 \cdot 5H_2O$ Rhombic system: $a_0$: 8.808, $b_0$: 9.525, $c_0$: 6.360

| d | $I/I_1$ | hkl | d | $I/I_1$ | hkl |
|---|---|---|---|---|---|
| 6.34 | 100 | 001 | 2.228 | <1 | 041 |
| 4.76 | 1 | 020 | 2.119 | 9 | 003 |
| 4.404 | 1 | 200 | 2.095 | <1 | 240 |
| 3.811 | 1 | 021 | 2.081 | <1 | 401 |
| 3.619 | 1 | 201 | 1.989 | <1 | 241 |
| 3.226 | 2 | 220 | 1.937 | 1 | 023 |
| 3.177 | 27 | 002 | 1.909 | 1 | 203 |
| 2.878 | 1 | 221 | 1.811 | <1 | 402 |
| 2.642 | 1 | 022 | 1.772 | <1 | 223 |
| 2.576 | 1 | 202 | 1.749 | <1 | 242 |
| 2.380 | <1 | 040 | 1.692 | <1 | 422 |
| 2.267 | 1 | 222 | 1.590 | <1 | 004 |

TABLE 5

Results of X-ray diffraction analysis of $Sm_2(BO_2)_2(CO_3)_2 \cdot 5H_2O$ Rhombic system: $a_0$: 8.743, $b_0$: 9.369, $c_0$: 6.261

| d | $I/I_1$ | hkl | d | $I/I_1$ | hkl |
|---|---|---|---|---|---|
| 6.25 | 100 | 001 | 2.194 | 13 | 041 |
| 4.68 | 50 | 020 | 2.187 | 11 | 400 |
| 4.366 | 69 | 200 | 2.087 | 11 | 003 |
| 3.748 | 16 | 021 | 2.063 | 28 | 240 |
| 3.579 | 26 | 201 | 2.019 | 3 | 331 |
| 3.194 | 38 | 220 | 1.979 | 11 | 420 |
| 3.130 | 27 | 002 | 1.960 | 16 | 241 |
| 2.846 | 35 | 221 | 1.907 | 7 | 023 |

TABLE 5-continued

Results of X-ray diffraction analysis of
$Sm_2(BO_2)_2(CO_3)_2 \cdot 5H_2O$ Rhombic system:
$a_0$: 8.743, $b_0$: 9.369, $c_0$: 6.261

| d | $I/I_1$ | hkl | d | $I/I_1$ | hkl |
|---|---|---|---|---|---|
| 2.812 | 10 | 112 | 1.884 | 16 | 203 |
| 2.603 | 14 | 022 | 1.792 | 8 | 402 |
| 2.544 | 24 | 202 | 1.747 | 9 | 223 |
| 2.344 | 35 | 040 | 1.723 | 8 | 242 |
| 2.236 | 22 | 222 | 1.674 | 8 | 422 |

Figure 2:
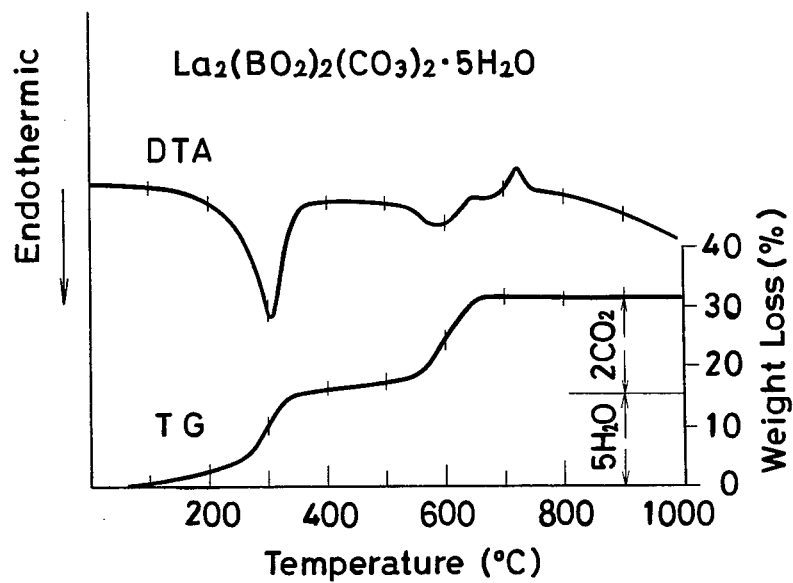
FIG. 2 is a diagram showing the results of the test similarly performed on the novel substance of the present invention obtained as described in Example 2, by means of a differential thermal analyzer and a thermobalance.

In FIG. 1 and FIG. 2, the endothermic peaks and the weight losses in the neighborhood of 300° C. correspond to the escape of 5 mols of $H_2O$ and the endothermic peaks and the weight losses in the neighborhood of 500° to 700° C. to the escape of 2 mols of $CO_2$. The exothermic peaks in the neighborhood of 700° C. are due to the crystallization of $Y_2O_3.B_2O_3$ or $La_2O_3.B_2O_3$. In the thermal decomposition of $Ln_2(BO_2)_2(CO_3)_3.5H_2O$, the escape of $CO_2$ occurs in one stage in some cases and in two stages in other cases.

The graphs of the aforementioned drawing indicate that anhydrous $Ln_2(BO_2)_2(CO_3)_2$ is produced at temperatures in the range of from 300° to 550° C. and that $Ln_2O_3.B_2O_3$ is obtained at temperatures above 650° C.

The yields of the hydrated borates indicated in the test runs were calculated respectively on the basis of the following reaction formulas.

1.
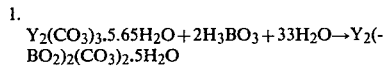

2.
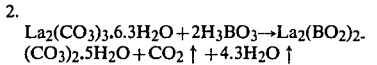

3.
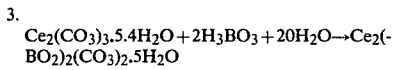

4.
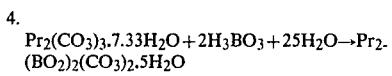

5.
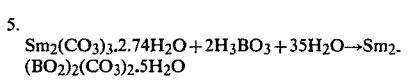

We claim:
1. A method for the manufacture of a hydrated carbonate-borate of the generic formula, $Ln_2(BO_2)_2(CO_3)_2.5H_2O$, which comprises charging an air-tightly sealable container with such amounts of $Ln(CO_3)_3.mH_2O$ wherein Ln is at least one member selected from the group consisting of the rare-earth elements and m is a number not greater than 15, and $H_3BO_3$ as to satisfy a molar ratio of 1:2, adding to the compounds water in such an amount as to correspond to 0 to 150% by weight based on the combined weight of the two compounds placed previously, keeping the contents of the container at temperatures in the range of from 30° to 100° C., giving the contents occasional agitation thereby expelling the formed $CO_2$ gas and maintaining the interior pressure of the container about one atmosphere and, after termination of the generation of $CO_2$ gas, removing the reaction mass from the container and thereafter drying the removed reaction mass.

* * * * *